United States Patent
Swart et al.

[11] Patent Number: 5,974,892
[45] Date of Patent: Nov. 2, 1999

[54] PRESSURE TRANSDUCER, IN PARTICULAR FOR SENSING A LATERAL COLLISION IN A MOTOR VEHICLE

[75] Inventors: Marten Swart, Obertraubling; Lorenz Pfau, Regensburg; Manfred Frimberger, Ergoldsbach; Arnulf Pietsch, Magdeburg, all of Germany

[73] Assignee: Siemens Aktiengesellschaft, Munich, Germany

[21] Appl. No.: 08/912,408

[22] Filed: Aug. 18, 1997

Related U.S. Application Data

[63] Continuation of application No. PCT/DE96/00220, Feb. 12, 1996.

[30] Foreign Application Priority Data

Feb. 17, 1995 [DE] Germany ............................ 195 06 014

[51] Int. Cl.$^6$ .............................. G01L 9/04; B60R 21/32
[52] U.S. Cl. ................................ 73/714; 73/726; 73/727; 280/735
[58] Field of Search ..................................... 280/735, 806; 73/726, 727, 720, 721, 718, 724

[56] References Cited

U.S. PATENT DOCUMENTS

| | | |
|---|---|---|
| 3,841,150 | 10/1974 | Pearson . |
| 4,190,796 | 2/1980 | Ishii ...................................... 73/726 X |
| 4,598,381 | 7/1986 | Cucci . |
| 5,287,748 | 2/1994 | Talmadge . |

FOREIGN PATENT DOCUMENTS

| | | |
|---|---|---|
| 0071962A1 | 2/1983 | European Pat. Off. . |
| 0169414A3 | 1/1986 | European Pat. Off. . |
| 4322488A1 | 5/1994 | Germany . |
| 90/11500 | 10/1990 | WIPO . |
| 93/24818 | 12/1993 | WIPO . |
| 94/11223 | 5/1994 | WIPO . |

OTHER PUBLICATIONS

"Bridge–to–Computer Data Acquisition System with Feedback Nulling", Curtis D. Johnson et al., IEEE Transactions on Instrumentation and Measurement, 39, Jun. 1990, No. 3, New York, pp. 531–534.

*Primary Examiner*—Joseph L. Felber
*Attorney, Agent, or Firm*—Herbert L. Lerner; Laurence A. Greenberg

[57] ABSTRACT

A pressure transducer, in particular for sensing a lateral collision in a motor vehicle, delivers an electric useful signal which is determined by a relative pressure change relating to a pressure event. Low-frequency changes in an output signal of a sensor device, which depend on the ambient pressure, are compensated by a control device with an integrating behavior. The sensitivity of the sensor device, as a manipulated variable, changes in a manner inversely proportional to the ambient pressure. Higher-frequency pressure changes in the output signal of the sensor device are not compensated, but as a result of the variable sensitivity of the sensor device, determine as relative pressure changes the useful signal, which is additionally independent of temperature influences and offset errors of the pressure transducer.

10 Claims, 4 Drawing Sheets

PRESSURE TRANSDUCER, IN PARTICULAR FOR SENSING A LATERAL COLLISION IN A MOTOR VEHICLE

CROSS-REFERENCE TO RELATED APPLICATION

This application is a continuation of International Application Ser. No. PCT/DE96/00220, filed Feb. 12, 1996.

BACKGROUND OF THE INVENTION

Field of the Invention:

The invention relates to a pressure transducer, in particular for sensing a lateral collision in a motor vehicle, which converts a pressure signal into an electric useful signal that is determined by an output signal of a variable-sensitivity sensor device, in which the sensor device and a control device form a single-loop control loop, and in which a control difference of the control device is determined by a setpoint and the output signal of the sensor device.

A pressure transducer which is known from International Publication WO 94/11223 uses an air pressure detector as a sensor to monitor the air pressure in a cavity of a motor vehicle side part, in particular in the event of a lateral collision of the motor vehicle, and emits an electric useful signal which is determined by the measured air pressure change. An electronic system evaluates the useful signal and, if appropriate, triggers restraining devices of the motor vehicle.

The useful signal of such a pressure transducer is not unambiguous.

U.S. Pat. No. 3,717,038 discloses a pressure transducer for determining the gas flow in a gas-operated engine. The pressure transducer has two sensor devices. The first sensor device picks up a pressure change in a measuring pipe and the second sensor device picks up the ambient pressure. The second sensor device is disposed in a feedback line of a control loop, with a control device which has a proportional behavior, as does the controlled system. A differential amplifier forms a control difference from output signals of the two sensor devices. An output signal of the differential amplifier is fed as a controlled variable to the second sensor device and influences the sensitivity of the second sensor device. The pressure transducer delivers a signal, at the output of the comparator, which is proportional to the pressure change in relation to the ambient pressure.

Such a pressure transducer requires two sensor devices which measure different pressure variables independently of each other. However, neither of the two sensor devices picks up the total pressure as the sum of the ambient pressure and a pressure change.

In U.S. Pat. No. 3,841,150, a pressure transducer is proposed in which an output signal of a sensor device depends on pressure changes. The sensor device contains two piezo-resistive measuring resistors on a diaphragm. A constant-current circuit configuration with a voltage source, operational amplifiers and calibration resistors ensures a constant current flow through the measuring resistors. The voltage difference between the voltages across the measuring resistors on one hand is used as a useful signal and on the other hand is fed back to the constant-current circuit configuration, in order to increase the linearity of the sensor device.

SUMMARY OF THE INVENTION

It is accordingly an object of the invention to provide a pressure transducer, in particular for sensing a lateral collision in a motor vehicle, which overcomes the hereinaforementioned disadvantages of the heretofore-known devices of this general type and, in particular, emits a useful signal which is independent of a prevailing ambient pressure.

When the pressure transducer is used in the motor vehicle, it delivers a signal which depends on air pressure changes and therefore on the height above sea level and the state of the weather. Therefore, the signal profile of a pressure change, which is caused by a "rapid" pressure event, such as a side impact, for example, also depends on the ambient pressure.

The useful signal of a pressure transducer, in the case of its above-mentioned use, is therefore then only suitable for quantitative evaluation, in particular for driving restraint systems, if pressure changes enter into the useful signal in a relative manner.

With the foregoing and other objects in view there is provided, in accordance with the invention, a pressure transducer, in particular for sensing a lateral collision in a motor vehicle, comprising a variable-sensitivity sensor device supplying an output signal determined by a measured total pressure, for determining an electric useful signal converted from a pressure signal; and a control device forming a single-loop control loop with the sensor device, the control device having a control difference determined by a setpoint and by the output signal of the sensor device, and the control device having a manipulated variable; the sensor device having a sensitivity dependent on the manipulated variable of the control device; and the control device having an integrating behavior and an integration time constant at least a factor of 2 greater than a period of a fundamental oscillation of a rapid change in the pressure signal.

In accordance with another feature of the invention, the control difference depends on the setpoint plus an offset variable determined by offset and common-mode errors of components.

In accordance with a further feature of the invention, the offset variable depends on a constant offset variable and a dynamic offset variable, and the dynamic offset variable is determined by the manipulated variable of the control device.

In accordance with an added feature of the invention, the integration time constant of the control device is at least a factor of 4 greater than the period of the fundamental oscillation of the rapid change in the pressure signal.

In accordance with an additional feature of the invention, the sensor device contains a sensor with a pressure-dependent resistor for measuring the total pressure.

In accordance with yet another feature of the invention, there is provided a resistance measuring bridge having the pressure-dependent resistor and having a bridge supply current/voltage determined by the manipulated variable of the control device and a bridge diagonal voltage determining the output signal of the sensor device.

In accordance with yet a further feature of the invention, there are provided two differential amplifiers having a common amplifier offset, the differential amplifiers calculating a balance of the bridge diagonal voltage, the setpoint and an offset variable, the resistance measuring bridge having a bridge offset, and the offset variable depending on the bridge offset, the common amplifier offset and the manipulated variable of the control device.

In accordance with yet an added feature of the invention, there is provided a measuring amplifier amplifying the control difference, the control device having an integrator with an input variable, and the input variable and the useful variable deriving from the amplified control difference.

In accordance with yet an additional feature of the invention, the measuring amplifier and the integrator have one operating point, and the control difference assumes the value of the operating point.

In accordance with a concomitant feature of the invention, there is provided a microprocessor monitoring the manipulated variable of the control device and emitting a warning signal when the manipulated variable changes abruptly.

Other features which are considered as characteristic for the invention are set forth in the appended claims.

Although the invention is illustrated and described herein embodied in a pressure transducer, in particular for sensing a lateral collision in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In the figures of the drawings, an element provided with a reference symbol in one figure has the same reference symbol in another figure, provided the element from the one figure coincides with the element from the other figure.

A pressure change $\Delta p$ which is caused by a pressure event starts from a prevailing ambient pressure $p_0$. A total pressure p (which is also referred to as an absolute pressure) is therefore composed additively of the pressure change $\Delta p$ and the ambient pressure $p_0$.

A signal is defined below as a time profile of a variable. A total pressure signal p(t) is therefore composed additively of a pressure change signal $\Delta p(t)$ and an ambient pressure signal $p_0(t)$. The pressure change signal $\Delta p(t)$ follows rapid changes of a pressure event, in particular pressure surges, which occur in the event of a lateral impact. The ambient pressure signal $p_0(t)$ follows slow changes in the ambient pressure $p_0$.

Figure 1:
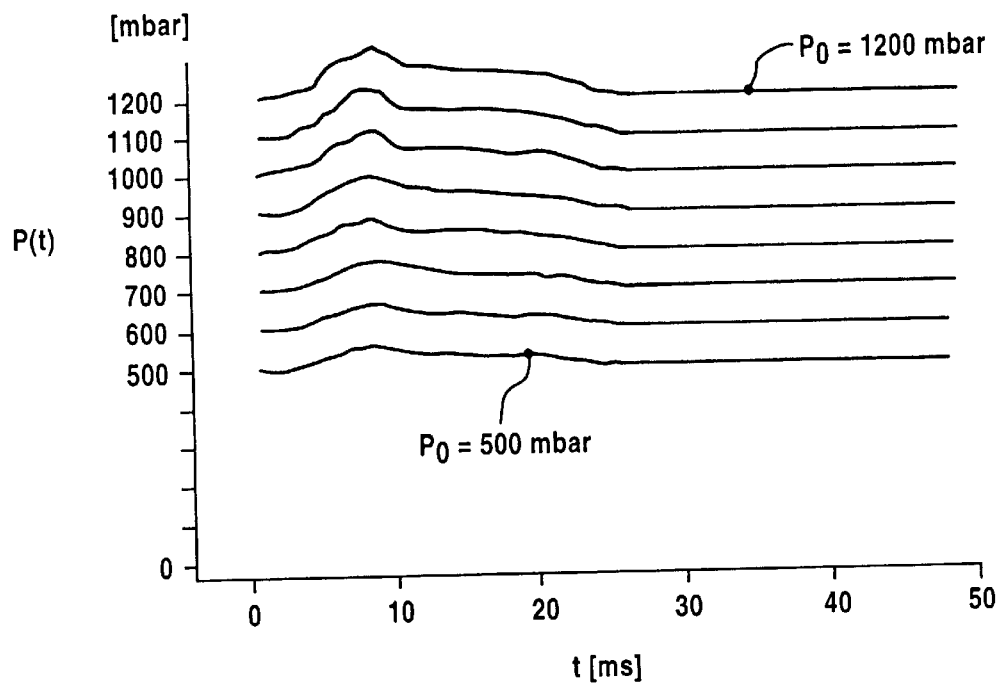
FIG. 1 is a diagram showing a time profile of a total air pressure in a vehicle door during a lateral collision, as a function of ambient air pressure.
Figure 2:
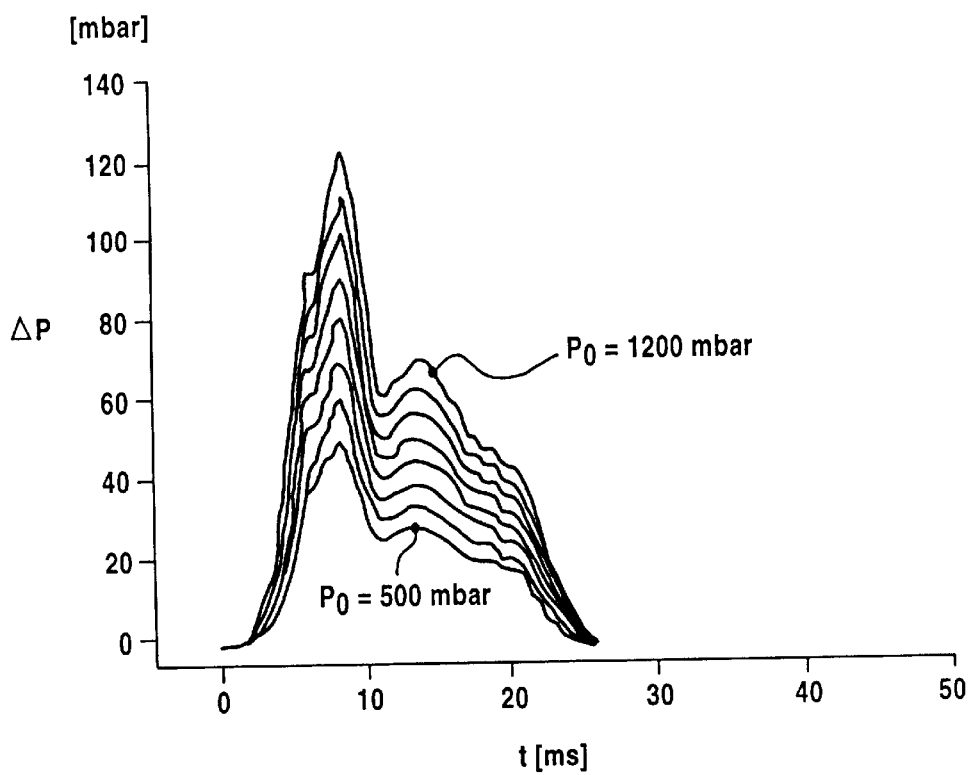
FIG. 2 is a diagram showing a time profile of an air pressure change in a vehicle door during a lateral collision, as a function of ambient air pressure.
Figure 3:
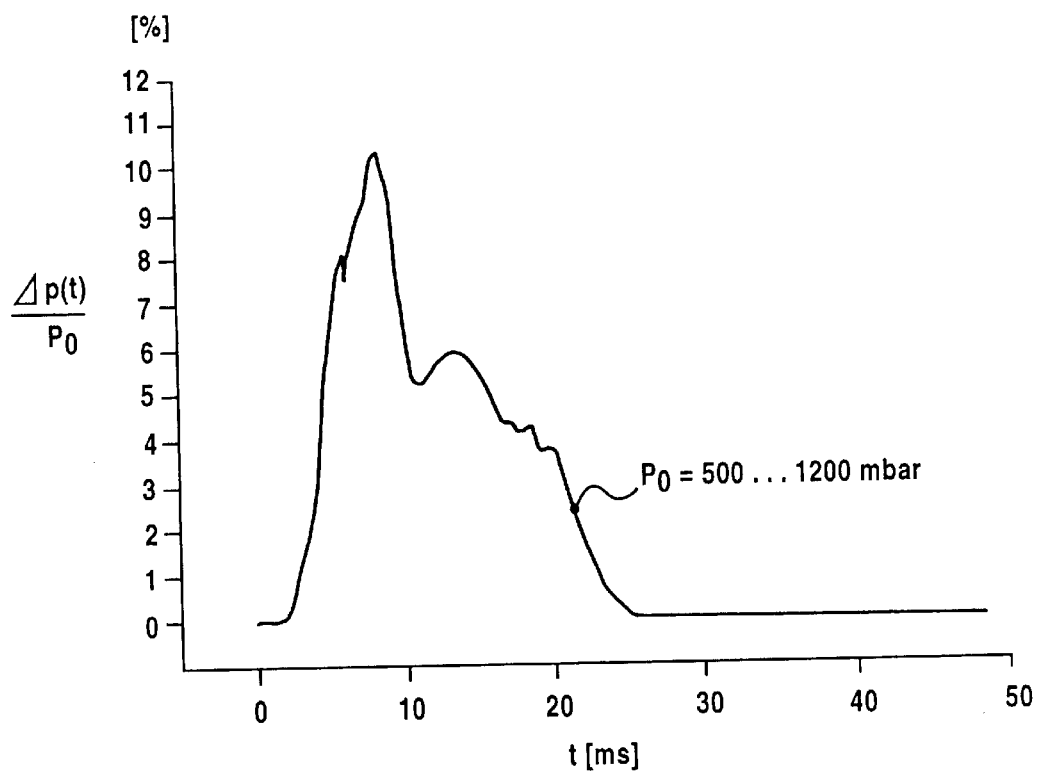
FIG. 3 is a time profile showing a relative air pressure change in a vehicle door during a lateral collision.

Referring now to FIGS. 1 to 3 in detail, it is noted that all of the pressure variables are air pressure variables. However, the pressure variables which are picked up can be measured in other pressure-transmitting media.

In the case of a motor vehicle, if a side part deforms during a lateral collision, a volume of a cavity in the side part changes and therefore the total pressure p in the cavity changes, as is seen in FIG. 1. An associated sensor device for total pressure measurement is disposed in the cavity, so that it can pick up the ambient pressure $p_0$ plus the pressure change $\Delta p$ caused by the lateral impact. FIG. 2 shows the associated pressure change signal $\Delta p(t)$, which is a surge signal of about 25 ms duration that is picked up by a sensor configuration for pressure change measurement disposed in the cavity. Following the impact at a time t=0 ms having defined impact conditions with respect to an impact body, impact angle, impact speed, etc., the pressure change $\Delta p$ in the cavity is a maximum of 50 mbar at a low ambient pressure $p_0$ of 500 mbar, for example, and is a maximum of 125 mbar in the case of a high ambient pressure $p_0$ of 1200 mnbar, for example. Thus the pressure change $\Delta p$ caused by the "lateral impact" pressure event rises with rising ambient pressure $p_0$, given the same volume change of the monitored volume. The pressure change $\Delta p$ related to the ambient pressure $p_0$, is the relative pressure change, which does not have the ambient pressure $p_0$ as a parameter. FIG. 3 shows the profile of the relative pressure change relating to the "lateral impact" pressure event. The ambient pressure $p_0$ in each case is picked up by using a dedicated sensor device, which is not exposed to the pressure change $\Delta p$ in the cavity caused by the lateral impact.

Figure 4:
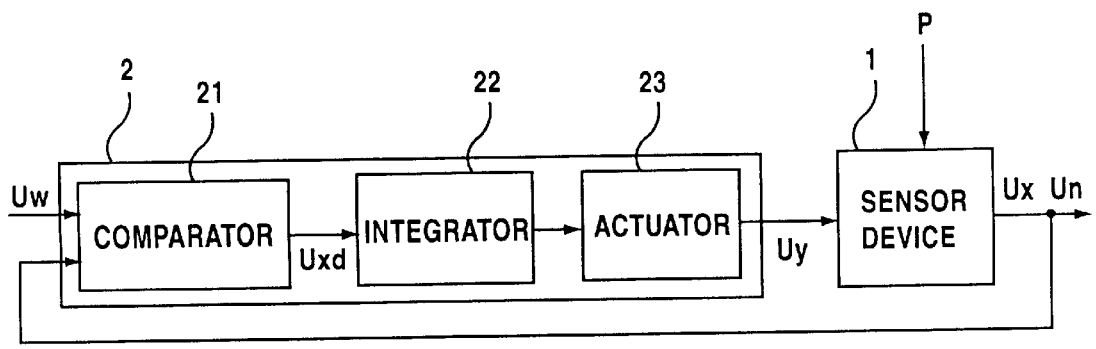
FIG. 4 is a first block circuit diagram of a pressure transducer.

A pressure transducer according to FIG. 4 contains a sensor device 1 which delivers an electric output variable $U_x$. The sensor device 1 is act ed upon by a manipulated variable $U_y$ of a control device 2 with an integrating behavior. The control device 2 contains a comparator 21, an integrator 22 and an actuator 23. The comparator 21 calculates a control difference $U_{xd}$ of the control device 2 from a setpoint $U_w$ and the output variable $U_x$ of the sensor device 1. A useful variable $U_n$ is derived from the output variable $U_x$ of the sensor device 1. The sensor device 1 and the control device 2 form a single-loop, closed control loop.

The sensor device 1 converts the total pressure signal p(t) into its electric output signal $U_x(t)$, which depends on the total pressure p. In a manner analogous to the pressure signal p(t), the output signal $U_x(t)$ of the sensor unit 1 also has two signal components: a low-frequency fundamental signal $U_{x0}(t)$, which is determined by the ambient pressure signal $p_0(t)$ and a variable sensitivity of the sensor device 1, and a higher-frequency information signal $U_x\Delta t$, which is determined by the pressure change signal $\Delta p(t)$ and the sensitivity of the sensor device 1.

The control difference signal $U_{xd}(t)$ thus also has two signal components: a fundamental difference signal $U_{xd0}(t)$, which is determined by the fundamental signal $U_{x0}(t)$ minus the setpoint $U_w$, and an information difference signal $U_{xd}\Delta$(t), which is equal to the information signal $U_x\Delta(t)$ An integration time constant of the integrator 22 is at least a factor 2 greater than the period of the fundamental oscillation of a picked-up pressure change signal $\Delta p(t)$: the integrator 22 acts as a low-pass filter and sums only the low-frequency fundamental difference $U_{xd0}$, but not the higher-frequency information difference $U_{xd}\Delta$. The larger the above-mentioned factor, the smaller the influence of the higher-frequency information difference $U_{xd}\Delta$ on the output signal of the integrator 22. The fundamental difference $U_{xd0}$ summed by the integrator 22 determines the sensitivity of the sensor device 1 through the actuator 23.

The fundamental frequency of a pressure change signal $\Delta p(t)$ in the event of a lateral collision of the motor vehicle lies at about 35 to 50 Hz. The integration frequency is preferably 2 to 3 Hz. It is possible for pressure change signals $\Delta p(t)$ having fundamental frequencies from 10 Hz to be detected by using an integration frequency of 1 to 5 Hz.

The control loop therefore in particular controls the low-frequency fundamental variable $U_{x0}$, which depends only on ambient pressure changes, as a component of the output variable $U_x$ of the sensor device 1, to the setpoint $U_w$. Therefore, if the ambient pressure $p_0$ rises/falls, and with it the fundamental variable $U_{x0}$ of the sensor device 1, then the sensitivity of the sensor device 1 will be reduced/increased because of the negative-positive fundamental difference $U_{xd0}$ which is established. After the transient response time of the control loop, the fundamental variable $U_{x0}$, which has risen fallen briefly, falls/rises once more to the setpoint $U_w$.

The pressure change $\Delta p$ also rises/falls with the increased/reduced ambient pressure $p_o$ in relation to a pressure event (seen in FIG. 2) and with it the information variable $U_x\Delta$ as a component of the output variable $U_x$ of the sensor device 1. This increase/reduction in the information variable $U_x\Delta$ is compensated by the above-mentioned reduction/increase in the sensitivity of the sensor device 1, which has been carried out upon the adjustment of the fundamental variable $U_x0$ of the sensor device to the setpoint $U_w$. The pressure transducer converts the pressure change signals $\Delta p(t)$, which depend on the ambient pressure $p_0$, into information signals $U_x\Delta(t)$ which are independent of the ambient pressure $p_0$ in such a way that, by adjusting the fundamental signal $U_x0$ to the setpoint $U_w$, the sensitivity of the sensor device 1 is changed in a manner inversely proportional to the ambient pressure $p_0$. The information variable $U_x\Delta$ is thus determined by the relative pressure change.

The useful variable $U_n$, which is in turn determined by the information variable $U_x\Delta$ can be derived directly at the output of the sensor device 1, but at the latest, as seen in the direction of action of the control loop, at the output of the comparator 21 or the input of the integrator 22. If the useful variable $U_n$ is derived directly at the output of the sensor device 1, it has a first signal component which is equal to the fundamental variable $U_{x0}$ of the sensor device 1 and is therefore quasi-constant. Slow changes in the ambient pressure $p_0$ result in an only minimal deviation of the fundamental signal $U_{x0}(t)$ from zero in the closed control loop, since the transient response time of the control loop is short in relation to the time changes in the ambient pressure $p_0$. The second signal component of the useful variable $U_n$ is equal to the information variable $U_x\Delta$. If the useful variable $U_n$ is derived from the control difference $U_{xd}$, then the useful variable $U_n$ depends only on the information variable $U_x\Delta$/ the information difference $U_{xd}\Delta$, and reproduces a relative pressure change without an additive constant.

Figure 5:
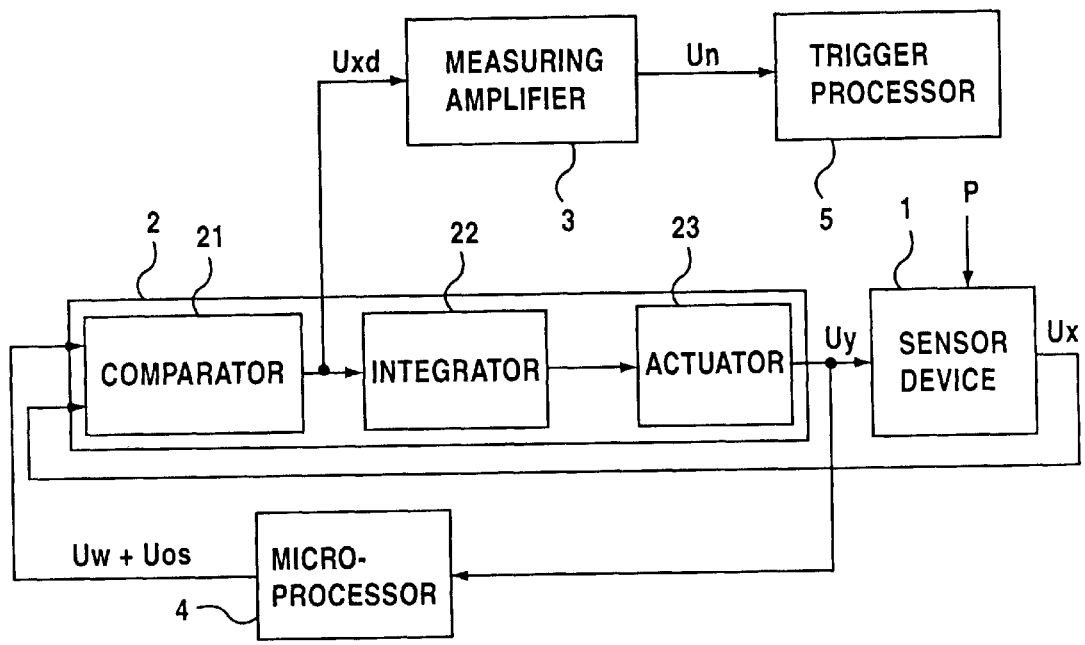
FIG. 5 is a second block circuit diagram of a pressure transducer.

The block diagram of a pressure transducer according to FIG. 5 shows the above-mentioned derivation of the useful variable $U_n$ from the control difference $U_{xd}$ of the control device 2. The control difference $U_{xd}$, which is amplified by a measuring amplifier 3, is present as the useful variable $U_n$ at an input of a trigger processor 5.

When such a pressure transducer is used for the detection of lateral collisions, the useful signal is evaluated by the trigger processor 5 according to a sufficiently well-known method: the trigger processor 5 compares the useful variable $U_n$ with a threshold value and, if this threshold value is exceeded, it drives a lateral airbag of the motor vehicle, for example. The useful variable $U_n$ can also firstly be integrated and then compared with an optionally time-variable threshold value.

In addition, the exemplary embodiment of the invention according to FIG. 5 takes into account possible error sources in a real pressure transducer. Therefore, the output variable $U_x$ of the real sensor device 1 contains, in addition to the fundamental variable $U_{x0}$ and the information variable $U_x\Delta$, a component-induced offset variable $U_{os}$, which can be composed of a constant offset variable $U_{osk}$ and a dynamic offset variable $U_{osd}$, and which is caused by offset and common-mode errors of the sensor device 1 and of the comparator 21. In the case of a configuration according to FIG. 4, the fundamental variable $U_{x0}$ with the implicit offset variable $U_{os}$ is controlled to the setpoint $U_w$, so that the fundamental variable $U_{x0}$ of the sensor device 1, in spite of the control, can in turn assume slightly variable values, in particular if the sensor device 1 has a dynamic offset variable $U_{osd}$. Thus the fundamental variable $U_{x0}$ with implicit offset variable $U_{os}$ is therefore controlled to the setpoint $U_w$ plus the offset variable $U_{os}$.

The setpoint $U_w$ and the constant offset variable $U_{osk}$ are determined before the initial operation of the pressure transducer and subsequently stored in the read-only memory of a microprocessor 4. If the dynamic offset variable $U_{osd}$ is determined by the sensitivity of the sensor device 1, it is continuously recalculated by the microprocessor 4 as a function of the manipulated variable $U_y$, and added to the setpoint $U_w$ and the constant offset variable component $U_{osk}$.

Figure 6:
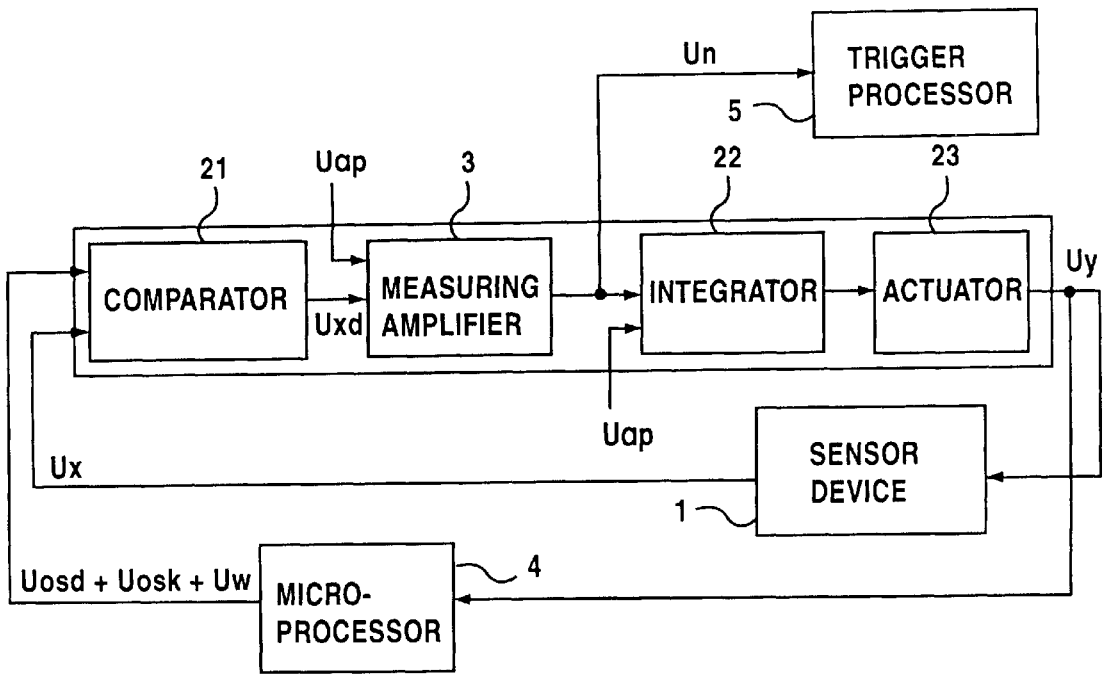
FIG. 6 is a third block circuit diagram of a pressure transducer.

In the exemplary embodiment of the invention according to FIG. 6, the measuring amplifier 3 is a component part of the control device 2 and amplifies the control difference $U_{xd}$.

In contrast with the configuration of the measuring amplifier 3 outside the control device 2 according to FIG. 5, in FIG. 6 deviations of the fundamental difference $U_{xd0}$ from zero are in particular also amplified, in addition to the information variable $U_x\Delta$/information difference $U_{xd}\Delta$ of the sensor device 1. These deviations result from changes in the fundamental variable $U_{x0}$ which are induced by the ambient pressure and are associated with an increased output signal at the integrator 22. The increased output signal of the integrator 22 is taken into account by reducing the slope of the transfer characteristic of the actuator 23. The useful variable $U_n$ is derived at the output of the measuring amplifier 3.

The measuring amplifier 3 and the integrator 22 are operated at one operating point $U_{ap}$. In this case, the setpoint $U_w$ is set in such a way that the control difference $U_{xd}$ is equal to the operating point $U_{ap}$ in the steady-state case.

An offset error in the measuring amplifier 3 is negligible, since its output variable is large by comparison with its offset variable.

Figure 7:
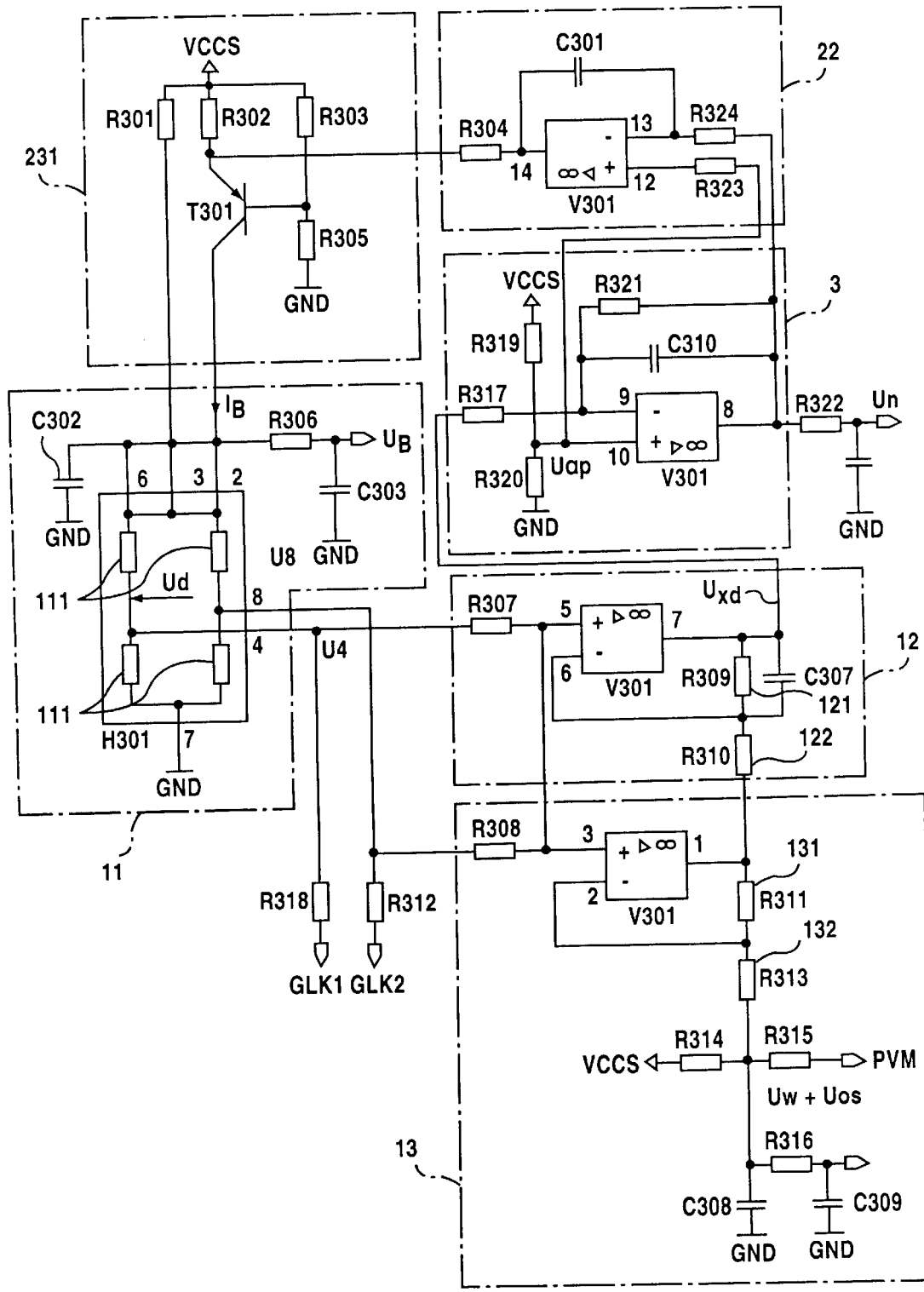
FIG. 7 is a schematic and block circuit diagram of a pressure transducer.

FIG. 7 shows a realization in circuitry of the configuration according to FIG. 6.

The sensor device 1 has a sensor with pressure-dependent resistors 111, which are disposed in a Wheatstone resistance measuring bridge 11 that has a bridge sensitivity, a bridge supply current/voltage $I_b/U_b$ and a bridge diagonal voltage $U_d=U_8-U_4$. The sensor converts the total pressure p approximately linearly into resistance values of the pressure-dependent resistor 111. To this end, the sensor has a measuring cell with a chamber which is closed in a vacuum by a diaphragm. The pressure-dependent resistor 111 of the sensor is a semiconductor strain gauge which operates according to the piezo-resistive principle. In particular, the semiconductor strain gauge and the diaphragm can be monolithically integrated.

The sensitivity of the resistance measuring bridge 11 is increased by constructing the resistance measuring bridge 11, in particular, as a full bridge with four pressure-dependent resistors 111. A large bridge offset $s_{off}$ of the resistance measuring bridge 11 can be precompensated under microprocessor control through terminals GLK1/GLK2.

The output variable Ux of the sensor device 1 is determined by the bridge diagonal voltage $U_d=U_8-U_4$ of the resistance measuring bridge 11, and therefore by the total pressure p, the bridge sensitivity, the bridge supply current/voltage $I_b/U_b$ and a common gain factor V of two differential amplifiers 12 and 13. The sensitivity of the sensor device 1 is determined by the bridge sensitivity, the bridge supply current/voltage $I_b/U_b$ and the common gain factor V. The differential amplifiers 12 and 13 calculate a balance of potentials $U_4$ and $U_8$ of the resistance measuring bridge 11, the setpoint $U_w$ and the offset variable $U_{os}$ to form the control difference $U_{xd}$, which is present at the output of the differential amplifier 12. The differential amplifiers 12 and 13 therefore also take over the function of the comparator 21. Resistors 121 and 132, as well as resistors 122 and 133 have identical values in pairs, in order to ensure that the setpoint $U_w$ and the offset variable $U_{os}$ enter into the control difference $U_{xd}$ with a gain of one. The control difference $U_{xd}$ is amplified by the measuring amplifier 3 and summed by the integrator 22, in each case with reference to the operating point $U_{ap}$. The output signal of the integrator 22 drives a current source 231 as the actuator 23, which delivers the bridge supply current $I_b$ for the resistance measuring bridge 11 and therefore determines the sensitivity of the sensor device 1. The actuator 23 can also be a voltage source which delivers the bridge supply voltage $U_b$. The integrator 22 can also be implemented in the form of a microprocessor. The measuring amplifiers delivers the useful variable $U_n$.

If the actuator 23 is a controlled current source 231, and if the resistance measuring bridge 11 has a short circuit, the bridge supply voltage $U_b$ breaks down. In order to ensure that this change in the bridge supply voltage $U_b$ is not misinterpreted as an abrupt change in the ambient pressure $p_0$ and adjusted, the bridge supply voltage $U_b$ is monitored under microprocessor control for abrupt changes. Therefore, a short circuit in the resistance measuring bridge 11 generates an error message. If the actuator 23 is a controlled voltage source, the monitoring of the bridge supply current $I_b$ for abrupt changes is also possible, but more complex to implement because of the current measurement which is necessary therefor.

The constant offset variable $U_{osk}$ of the sensor device 1 is determined by the product of a common amplifier offset $V_{off}$ of the differential amplifiers 12 and 13 and their common gain factor V. In order to determine the amplifier offset $V_{off}$, a first setpoint $U_{w1}$ is set at the pressure transducer, which picks up only the ambient pressure $p_0$. A bridge supply voltage $U_{b1}$ which is established and which lies in the control range of the integrator 22, is measured after the transient response time of the control loop. A second predefined setpoint $U_{w2}$, which deviates as sharply as possible from the first setpoint $U_{w1}$, causes a second bridge supply voltage $U_{b2}$. The amplifier offset $V_{off}$ is calculated from the measured variables according to the rule:

$$V_{off}*V=((U_{w2}*U_{b1}-U_{w1}*U_{b2})/(U_{b1}-U_{b2}))-U_{ap}.$$

The dynamic offset variable $U_{osd}$ of the sensor device 1 is determined by the product of a bridge offset $s_{off}$ of the resistance measuring bridge 11 and the common gain factor V of the differential amplifiers 12 and 13. The bridge offset $s_{off}$ also takes into account common-mode errors of the differential amplifiers 12 and 13. In order to determine the bridge offset $s_{off}$, the pressure transducer picks up a total pressure surge signal $p_3(t)$ having a maximum total pressure $p_3$. The values of a bridge supply voltage $U_{b3}$, a setpoint $U_{w3}$ and a useful variable $U_{n3}$ which are established are measured. A reference pressure transducer determines a maximum pressure change $\Delta p_3=p_3-p_0$ from the above-mentioned pressure surge signal $p_3(t)$, in relation to the ambient pressure $p_0$. The bridge offset $s_{off}$ is then calculated from the measured variables according to the rule:

$$S_{off}*V=(U_{w3}-U_{ap}-V_{off}*V-U_{n3}*(p_3-p_0)/V1*p_0)/U_{b3},$$

where V1 is the gain factor of the measuring amplifier 3. Furthermore, in order to determine the bridge offset $s_{off}$, the pressure transducer can also be acted upon by a first static total pressure $p_4$. A bridge supply voltage $U_{b4}$ which is established is measured. Likewise, a bridge supply voltage $U_{b5}$ is measured when the pressure transducer is exposed to a second static total pressure $p_5$, which is smaller than the first total pressure $p_4$. The bridge offset $S_{off}$ is then calculated from the measured variables according to the rule:

$$S_{off}*V1=2*(p_5*U_{b5}-p_4*U_{b4})/(U_{b5}*U_{b4}*(p_5-p_4)).$$

Before initial operation of the pressure transducer, the setpoint $U_w$ should be set in such a way that the control difference $U_{xd}$ assumes the value of the operating point $U_{ap}$. The equalization can be carried out at any arbitrary ambient pressure and obeys the rule:

$$U_{xd}=U_{ap}=U_w+U_{osk}+U_{osd},$$

where $$U_{osk}=V_{off}*V \text{ and } U_{osd}=s_{off}*V*U_y.$$

The pressure transducer in particular has the advantage of automatically adjusting disturbance variables and errors in the useful signal path. Temperature-dependent amplification errors of the resistance measuring bridge 11 and the differential amplifiers 12 and 13 are likewise compensated, as is a loss of sensitivity of the sensor as a result of a leak in its diaphragm. Errors occurring as a result of resistors which are subject to tolerance in the sensor device are compensated. Due to the control, the knowledge of the sensitivity of the sensor is also no longer necessary for the purpose of quantitative evaluation of the useful variable Uf.

We claim:

1. A pressure transducer, comprising:
   a variable-sensitivity sensor device supplying an output signal determined by a measured total pressure, for determining an electric useful signal converted from a pressure signal; and
   a control device forming a single-loop control loop with said sensor device, said control device having a control difference determined by a setpoint and by the output signal of said sensor device, and said control device having a manipulated variable;
   said sensor device having a sensitivity dependent on the manipulated variable of said control device; and
   said control device having an integrating behavior and an integration time constant at least a factor of 2 greater than a period of a fundamental oscillation of a rapid change in the pressure signal.

2. The pressure transducer according to claim 1, wherein the control difference depends on the setpoint plus an offset variable determined by offset and common-mode errors of components.

3. The pressure transducer according to claim 2, wherein the offset variable depends on a constant offset variable and a dynamic offset variable, and the dynamic offset variable is determined by the manipulated variable of said control device.

4. The pressure transducer according to claim 1, wherein the integration time constant of said control device is at least a factor of 4 greater than the period of the fundamental oscillation of the rapid change in the pressure signal.

5. The pressure transducer according to claim 1, wherein said sensor device contains a sensor with a pressure-dependent resistor for measuring the total pressure.

6. The pressure transducer according to claim 5, including a resistance measuring bridge having said pressure-dependent resistor and having a bridge supply current/voltage determined by the manipulated variable of said control device and a bridge diagonal voltage determining the output signal of said sensor device.

7. The pressure transducer according to claim 6, including two differential amplifiers having a common amplifier offset, said differential amplifiers calculating a balance of the bridge diagonal voltage, the setpoint and an offset variable, said resistance measuring bridge having a bridge offset, and the offset variable depending on the bridge offset, the common amplifier offset and the manipulated variable of said control device.

8. The pressure transducer according to claim 1, including a measuring amplifier amplifying the control difference, said control device having an integrator with an input variable, and the input variable and the useful signal deriving from the amplified control difference.

9. The pressure transducer according to claim 8, wherein said measuring amplifier and said integrator have one operating point, and the control difference assumes the value of the operating point.

10. The pressure transducer according to claim 1, including a microprocessor monitoring the manipulated variable of said control device and emitting a warning signal when the manipulated variable changes abruptly.

* * * * *